DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 422

T896,032
SUBSTRATES HAVING STRIPPABLE PROTECTIVE COATINGS

Travis L. Gordy, Ponca City, Okla., assignor to Continental Oil Company, Ponca City, Okla.

Continuation of abandoned application Ser. No. 783,712, Dec. 13, 1968. This application Mar. 29, 1971, Ser. No. 129,193

Int. Cl. C08f *45/52*
U.S. Cl. 260—28.5 V
No Drawing. 17 Pages Specification

Articles of manufacture are described which comprise a substrate (e.g. automobile molding) having a readily strippable coating of a composition comprising petroleum wax and ethylene-isobutyl acrylate copolymer. Suitable ethylene-isobutyl acrylate copolymer contains from about 18 to about 32 weight percent isobutyl acrylate and has melt indexes in the range of from about 2 to about 260. The petroleum wax-ethylene/isobutyl acrylate composition forms a readily strippable film on many substrates which are coated for protection. The composition works well without a release agent on substrates having very smooth surfaces. For example, the composition has worked well, not requiring a release agent, on numerous articles made of aluminum, stainless steel, vinyl, acrylonitrile-butadiene-styrene (ABS) polymer and combinations of these materials. On some surfaces having a microscopic roughness (e.g. certain types of anodized aluminum), it is helpful to include a very small amount of release agent to provide better stripping. Examples of suitable release agents are sorbitan monooleate, sorbitan monopalmitate and sorbitan monostearate. The various materials can be present in the following amounts (parts by weight): petroleum wax—45 to 65; ethylene-isobutyl acrylate copolymer—35 to 55.